United States Patent
Cabodi et al.

(10) Patent No.: US 11,712,818 B2
(45) Date of Patent: Aug. 1, 2023

(54) WEAR DETECTOR FOR GLASS FURNACE

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Olivier Citti, Cavaillon (FR); Jean-Gaël Vuillermet, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 419 days.

(21) Appl. No.: 17/263,792

(22) PCT Filed: Jul. 26, 2019

(86) PCT No.: PCT/EP2019/070233
§ 371 (c)(1),
(2) Date: Jan. 27, 2021

(87) PCT Pub. No.: WO2020/025493
PCT Pub. Date: Feb. 6, 2020

(65) Prior Publication Data
US 2021/0308902 A1 Oct. 7, 2021

(30) Foreign Application Priority Data
Aug. 1, 2018 (FR) ........................ 1857214

(51) Int. Cl.
*C03B 5/42* (2006.01)
*F27D 21/00* (2006.01)
(Continued)

(52) U.S. Cl.
CPC ............ *B28B 7/162* (2013.01); *C03B 5/42* (2013.01); *F27D 21/0021* (2013.01); *G01D 5/35316* (2013.01)

(58) Field of Classification Search
CPC ............................ G01D 5/35316; C03B 5/42
See application file for complete search history.

(56) References Cited

U.S. PATENT DOCUMENTS

| 2003/0173720 A1 | 9/2003 | Musso et al. |
| 2011/0144790 A1 * | 6/2011 | Gerritsen ............... G01K 1/026 374/161 |

FOREIGN PATENT DOCUMENTS

| GB | 2 340 226 A | 2/2000 | |
| GB | 2340226 A * | 2/2000 | ......... F27D 21/0021 |
| WO | 2015147827 A1 | 10/2015 | |

OTHER PUBLICATIONS

Chinese Office action for Corresponding Chinese Application No. 201980065332.9, dated May 30, 2022, 11 pages.
(Continued)

*Primary Examiner* — Jason L Vaughan
*Assistant Examiner* — Amanda Kreiling
(74) *Attorney, Agent, or Firm* — Ronald M. Kachmarik; Cooper Legal Group LLC (57) ABSTRACT

A method for producing a glass furnace, including a refractory portion, a waveguide with a measurement portion extending into the refractory portion and an interrogator connected to an input of the waveguide to inject an interrogation signal. The measurement portion incorporating a sensor to send a response signal to the interrogator in response to the injection. The interrogator analyzing the response signal and sending a message. Arranging, inside a mold, a temporary part configured to leave space for a compartment for the measurement portion. Preparing a starting feedstock and introducing the starting feedstock into the mold such that the part is embedded therein to obtain a preform. Hardening the preform to form the refractory portion. Removing the temporary part to make the compartment. Assembling the refractory portion with other constituents.

(Continued)

ent elements and introducing the measurement portion into the compartment and connecting the interrogator to the input of the waveguide.

16 Claims, 6 Drawing Sheets

(51) Int. Cl.
*B28B 7/16* (2006.01)
*G01D 5/353* (2006.01)

(56) References Cited

OTHER PUBLICATIONS

International Search Report corresponding to International Application No. PCT/EP2019/070233 dated Oct. 8, 2019, 5 pages.

* cited by examiner

WEAR DETECTOR FOR GLASS FURNACE

TECHNICAL FIELD

The invention relates to a glass furnace comprising:
a refractory portion defining a hot face, and
a wear detector for detecting the wear of the hot face of this refractory portion.

PRIOR ART

A glass furnace comprises a melting tank in which the raw materials are melted so as to obtain a bath of molten glass. The vessel conventionally comprises a floor, which is substantially horizontal, and a side wall formed by an assembly of refractory blocks. In service, this floor and these blocks, referred to generically as "refractory portions", are subjected to extreme conditions, and in particular to a corrosive and abrasive environment which causes their progressive wear.

In the regions in contact with molten glass in particular, the state of wear cannot be evaluated visually. To measure the remaining thickness of a refractory block, that is to say the distance between its hot face and its cold face, opposite the hot face, it is therefore conventional practice to use, at the level of the fluxline, a hook. This method has the drawback of requiring partial disassembly and then reassembly of the furnace and of providing only a one-off measurement. More recently, WO2015147827 cites an apparatus that sends waves, and in particular radar waves, through the block. The reflected waves are analyzed when possible. In practice, this procedure takes a long time to implement and does not allow real-time monitoring.

Furthermore, to date, there are no means for measuring the remaining thickness of a floor.

There is therefore a need for a solution that makes it possible to evaluate, for all of the areas of the furnace, continuously, the remaining thickness of a refractory portion of a glass furnace.

An aim of the invention is to address this need.

SUMMARY OF THE INVENTION

According to the invention, this aim is achieved by means of a glass furnace comprising:
a refractory portion;
a waveguide, preferably an optical fiber, comprising a measurement portion extending into the refractory portion;
an interrogator connected to an input of the waveguide and configured to inject an interrogation signal into said input;
the measurement portion of the waveguide incorporating at least one sensor configured to send a response signal to the interrogator in response to the injection of said interrogation signal,
the interrogator being configured to analyze the response signal and to send a message according to said analysis.

As will be seen in more detail in the remainder of the description, the sensor is subjected to a temperature that is dependent on the environment of the refractory portion, but also on the thickness of material that separates it from this environment. As this thickness decreases, the sensor can modify its reaction to the reception of the interrogation signal. For example, it stops operating if the temperature is too high or it modifies the response signal. This reaction allows the interrogator to be thus informed of a decrease in the thickness of the refractory portion.

A glass furnace according to the invention may also comprise one or more of the following optional features:
the measurement portion and the interrogator measure one or more temperatures along the measurement portion, which makes it possible to locally evaluate the wear of the refractory portion;
the waveguide is an optical fiber, preferably made of glass or of sapphire;
the waveguide has a diameter of less than 200 micrometers;
the refractory portion is a refractory block or a floor,
the sensor is a Bragg grating;
the measurement portion of the waveguide comprises a plurality of said sensors, preferably more than five, more than eight, more than ten, preferably more than twenty sensors;
the sensors are arranged at regular intervals along the waveguide;
the interrogator is configured to determine, according to the analysis of the or, if the waveguide comprises a plurality of sensors, response signals, a level of wear and/or a rate of wear of the refractory portion;
the waveguide opens out onto a cold face of the refractory portion, opposite the hot face;
the waveguide takes the general shape of a fiber, the measurement portion of which is preferably substantially rectilinear and/or extends in the direction of the thickness of the refractory portion.

In one embodiment, the furnace may comprise one or more of the following optional features:
the measurement portion of the waveguide is oriented toward a hot face of the refractory portion exposed to a space of the furnace containing molten glass (the direction of orientation does not necessarily form an angle of 90° with the hot face);
the measurement portion of the waveguide is oriented, at least partially, or even completely, perpendicular to the hot face.

In another embodiment, the furnace may comprise one or more of the following optional features:
the measurement portion of the waveguide extends, at least partially, or even completely, parallel to the hot face;
the measurement portion of the waveguide comprises a non-stick coating, for example of graphite or boron nitride or based on a polymer (for example Teflon, silicone);
the furnace comprises a sheet consisting of a set of measurement portions of said waveguides extending along a curved or planar, preferably planar, surface, preferably along a plane parallel to the hot face;
the sheet is arranged in the refractory portion;
the measurement portions of said sheet are separated from one another by a distance greater than 1 cm, greater than 5 cm, greater than 10 cm, greater than 20 cm, and/or smaller than 100 cm, smaller than 80 cm, or smaller than 50 cm;
said measurement portions of the sheet extend parallel to one another or intersect;
at at least some of the intersections between measurement portions, sensors are arranged on each measurement portion;
preferably, at more than 50%, preferably more than 80% of the intersections between measurement portions, each measurement portion has a sensor,
at said intersections, all of the measurement portions are in contact with one another;

the number of measurement portions intersecting at a point of intersection is greater than two, or even greater than three or greater than five;

the sensors of the sheet are distributed in a pattern, preferably in a regular pattern, preferably so as to form a square or rectangular mesh grid;

the furnace comprises more than one, more than two, preferably more than three, preferably more than five of said sheets, said sheets being preferably parallel to one another, preferably parallel to the hot face, and preferably regularly spaced in a direction perpendicular to the hot face, the distance between two successive layers being preferably smaller than 10 cm, 5 cm, or 2 cm;

each sheet is arranged in the refractory portion;

the sensors of at least one first sheet are distributed in a first pattern, the sensors of at least one second sheet are distributed in a second pattern and, preferably, the first pattern and the second pattern are identical, and, further preferably, superposed over one another in a direction perpendicular to the hot face of the refractory portion;

the furnace comprises a group of at least two, preferably at least three, at least five sensors, arranged in the refractory portion and superposed in a direction of superposition which is not parallel to the hot face of the refractory portion and, preferably, which is perpendicular to the hot face of the refractory portion;

the furnace comprises more than five, more than 10, more than 50, preferably more than 80 of said groups per m² of the hot face, a sensor belonging only to one group, the directions of superposition being preferably parallel to one another.

The invention also relates to a method for producing a furnace according to the invention, said method comprising the following steps:

A) arranging, inside a mold,
  i) said measurement portion of the waveguide, or
  ii) a temporary part configured to, after production of the refractory portion and removal of the temporary part, leave space for a compartment for accommodating said measurement portion of the waveguide;

B) preparing a starting feedstock and introducing said starting feedstock into the mold such that said measurement portion in case i) or said temporary part in case ii) is embedded therein, so as to obtain a preform;

C) hardening said preform.

In one embodiment, in step C), the preform is sintered at a temperature of between 400 and 1200° C.

In an alternative embodiment, the starting feedstock is a bath of molten material, the hardening in step C) resulting from the cooling of said starting feedstock.

The hardening may also result from solidification obtained by means of a binder, for example a hydraulic binder such as a cement.

The invention also relates to a method for measuring the wear of a refractory portion of a glass furnace according to the invention, said method comprising the following steps:

a. producing a glass furnace according to the invention;

b. controlling the interrogator such that it injects an interrogation signal into the input of the waveguide and, if the sensor is operational, receives a response signal from the sensor;

c. analyzing the response signal so as to determine information relating to the wear of the refractory portion in the region of the sensor.

The analysis may in particular consist in determining whether an identified sensor returns an interrogation signal and, if not, that is to say in a situation of the sensor failing, in determining a level of local wear of the refractory portion.

Preferably, a plurality of sensors, belonging to one or more waveguides, are superposed in the thickness of the refractory portion. The analysis thus advantageously makes it possible to detect various levels of wear.

BRIEF DESCRIPTION OF THE FIGURES

Other features and advantages of the invention will become more clearly apparent from reading the following detailed description and from examining the appended drawing, in which:

FIG. 1 schematically shows one embodiment of a block of a furnace according to the invention, the block being shown in perspective;

FIG. 2 (2a-2b) illustrates the operation of the block of FIG. 1, in one preferred embodiment;

FIG. 3 (3a-3d) illustrates various signals used in a furnace according to the invention;

In the various figures, identical references are used to denote identical or analogous members.

DEFINITIONS

What is meant by "refractory portion" is an element of the furnace made of a refractory material. A refractory portion may be a block, but also an assembly of blocks, for example a side wall of a tank, or a floor, in particular formed by casting. A refractory portion is conventionally made from a molten material or from a sintered material.

Conventionally, the "thickness" of a refractory portion of a glass furnace is its dimension measured in a direction perpendicular to its hot face. For example, for a tank side block in contact with molten glass, the thickness is measured in a substantially horizontal direction toward the bath of molten glass. For a floor, the thickness is measured in a vertical direction.

The "hot face" is the face of a refractory portion which is exposed to a space of the furnace containing, in use, molten glass or intended to contain molten glass. The hot face may be in contact, or intended to be in contact, with molten glass and/or with the gaseous environment that extends above the molten glass. The hot face is thus the face of the refractory portion which is subjected or is intended to be subjected to the highest temperatures. All of the hot faces of the blocks of the side wall of the glass melting tank may together also, by extension, be qualified as a "hot face". The upper surface of the floor may also be qualified as a "hot face".

The adjective "hot" is used for the sake of clarity. Before the furnace is in service, the "hot" face is the face which is intended to be subjected to the highest temperatures after being put into service.

Unless specified otherwise, the "depth" is measured perpendicular to the hot face, toward the interior of the refractory portion.

What is meant by "waveguide" is any means, different from the refractory portion, for guiding an electromagnetic wave, and in particular a wave in the visible frequencies.

To assess whether two measurement portions intersect, these measurement portions are observed perpendicular to the hot face.

"Include", "have" or "comprise" should be interpreted in a broad, non-limiting manner.

DETAILED DESCRIPTION

Waveguide Inside a Block

Figures 1, 2A, 2B:
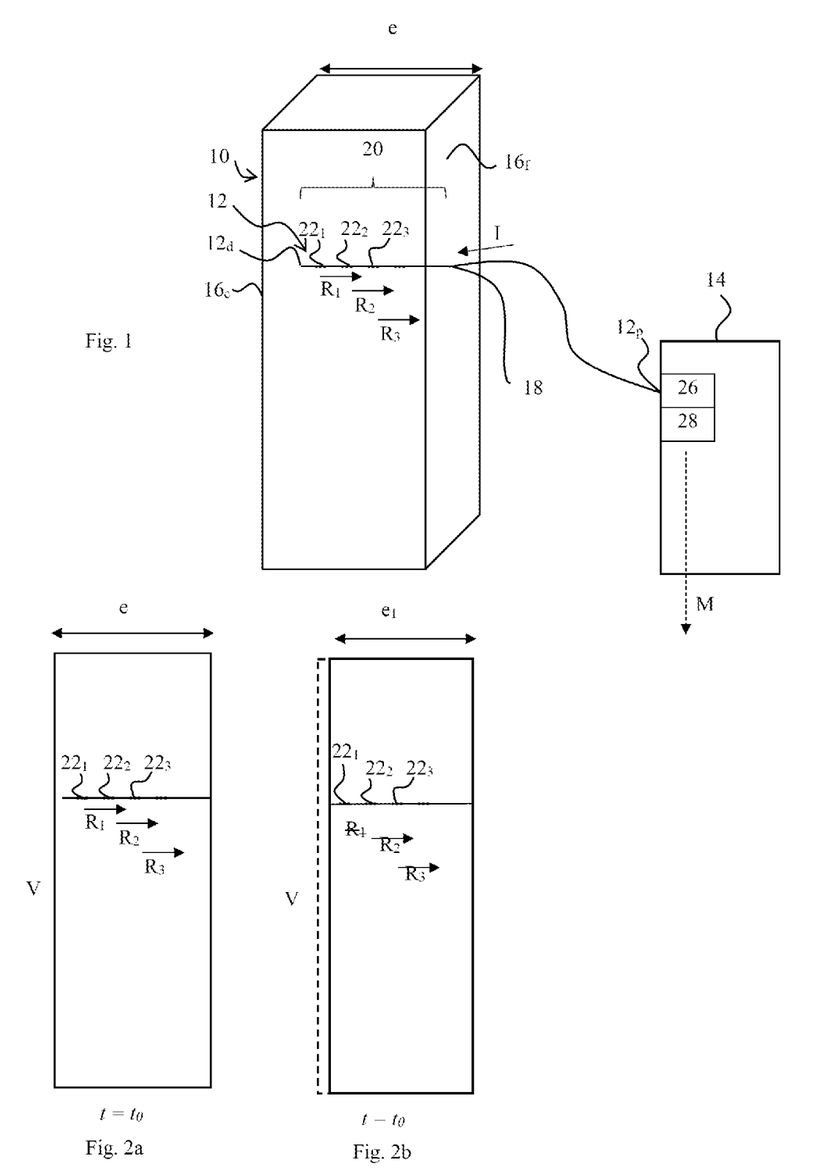

As shown in FIG. 1, a furnace according to the invention comprises a furnace refractory portion, in this case a refractory block 10, a waveguide, in this case an optical fiber 12, and an interrogator 14.

The refractory block may be a side block of a glass furnace tank, but the invention is not limited to such a side block.

The shape of the block is not limiting. In the embodiment shown, it takes a general rectangular parallelepipedal shape and defines a large hot face $16_c$ and a large cold face $16_f$, opposite the hot face $16_c$. The thickness "e" is used to refer to the distance between the hot face and the cold face.

The refractory block is preferably made of a material resistant to temperatures of higher than 500° C., or even 600° C., or even 1000° C.

Any refractory block used in conventional glass furnaces may be used. In particular, each refractory block may be made from a molten material.

A refractory block may consist, for more than 90% of its weight, of one or more oxides chosen from the group consisting of $ZrO_2$, $Al_2O_3$, $SiO_2$, $Cr_2O_3$, $Y_2O_3$, and $CeO_2$. It preferably comprises more than 90% $ZrO_2$, $Al_2O_3$ and $SiO_2$. In one embodiment, the block has more than 15% $ZrO_2$, preferably between 26 and 95% $ZrO_2$. Its composition is typically, for a total of more than 90%, preferably more than 95%: 26 to 40% $ZrO_2$; 40 to 60% $Al_2O_3$; 5 to 35% $SiO_2$. The vitreous phase represents approximately 5 to 50%, preferably between 10 and 40%. Preferably, this vitreous phase is a silicate phase, the proportion by weight of $Na_2O$ of which is lower than 20%, preferably lower than 10% and/or the proportion by weight of $Al_2O_3$ of which is lower than 30%.

All of the percentages are conventionally by weight based on the oxides. Preferably, the oxides represent more than 90%, preferably more than 95%, preferably more than 98% of the weight of the refractory block.

The optical fiber 12 is preferably made of glass or of sapphire. Advantageously, if the corrosion of the block 10 leads to the optical fiber being exposed to the interior of the tank, the attacking of an optical fiber made of glass does not lead to contamination of the molten glass. An optical fiber made of sapphire is well suited for regions of high temperature.

The optical fiber preferably has a diameter smaller than 200 μm, preferably smaller than 150 μm. Advantageously, its presence does not substantially affect the mechanical properties of the block.

The optical fiber 12 extends between a proximal end $12_p$ and a distal end $12_d$. The proximal end $12_p$, or "input", of the optical fiber 12 is connected to the interrogator 14.

The distal end $12_d$ is preferably inside the block 10. In particular, it is preferably less than 10 cm, less than 5 cm, less than 2 cm, less than 1 cm from the hot face $16_c$.

At the proximal end $12_p$, the optical fiber 12 exits the block 10, preferably via the cold face $12_f$, through an opening 18.

In one preferred embodiment, the portion of the optical fiber 12 which extends inside the block 10, or "measurement portion 20", extends rectilinearly, preferably parallel to the direction of the thickness of the block, as shown.

However, this embodiment is not limiting. The measurement portion may extend, for example, substantially parallel to the hot face. However, as will be seen in more detail in the part of the description relating to application to a furnace floor, the local wear of the block can then no longer be measured when the sensor arranged at this location is out of service.

The measurement portion comprises one, preferably a plurality of, sensor(s) $22_i$. The distance between two successive sensors $22_i$, along the optical fiber 12, may be constant or variable. It is preferably smaller than 10 cm, 5 cm, 3 cm, or 1 cm. The precision of the information provided by the interrogator is improved thereby.

Preferably, a sensor, preferably each sensor, is a local modification of the structure of the optical fiber, which reflects at least a portion of the signal that it receives from the interrogator.

In one embodiment, the optical fiber has only one sensor, which reflects at least a portion of the interrogation signal I.

In one embodiment, the optical fiber comprises a plurality of sensors, which each reflect a portion of the interrogation signal I and allow another portion to pass so that it may reach the one or more other sensors arranged downstream. Each operational sensor thus responds to the interrogation signal, which makes it possible, using a single optical fiber, to obtain information from different regions of the block, and in particular at different depths. Specifically, if a sensor does not respond, the interrogator can conclude therefrom that this sensor has been destroyed due to greater exposure to temperature, and therefore conclude that the remaining thickness between the sensor and the hot face has been decreased.

If the sensors extend parallel to the hot face, it is thus possible to detect wear in different regions of the hot face.

If the sensors extend perpendicular to the hot face, it is possible to measure a level of wear by identifying the sensors which are still in service, i.e. those which have not been destroyed by excessive temperature.

To determine the origin of a response signal, the interrogator can use the difference between the time at which the interrogation signal was transmitted and the time at which the response signal was received.

Figure 3A:
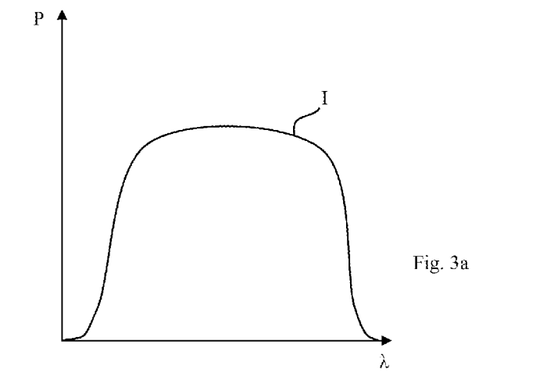
Figure 3B:
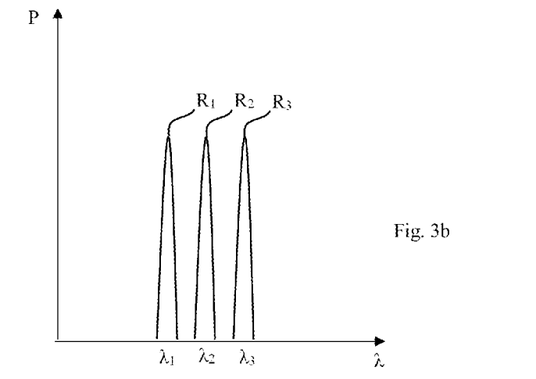
Figure 3C:
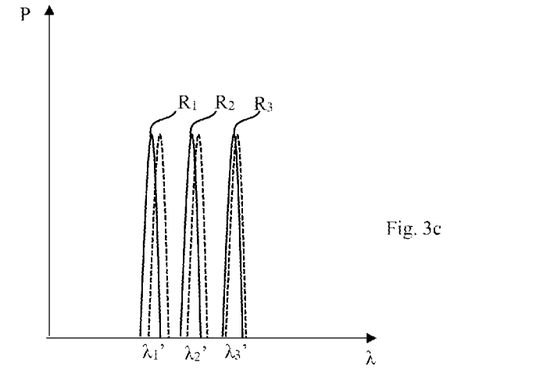

As illustrated in FIG. 3, each sensor may also reflect only a portion of the spectrum of frequencies (frequencies λ in FIG. 3a) of the interrogation signal I injected by the interrogator 14 (in FIGS. 3a, 3b and 3c, "P" denotes the strength of the signals). Just analyzing the frequencies of the signals received thus makes it possible to determine the origin of the response signals. In FIG. 3b, each sensor $22_i$ has thus returned a spectrum of frequencies centered on a frequency $\lambda_i$ that is specific thereto. The presence of a peak centered on the frequency $\lambda_i$ thus allows the interrogator to deduce the presence of the sensor $22_i$.

A sensor may be used to return a binary response, in particular to indicate that it is in or out of service. It then acts as a detector.

A sensor may be used to return a response signal that is modified according to the temperature. It then acts as a measurement sensor.

A sensor $22_i$, preferably each sensor $22_i$, is a Bragg grating.

Optical fibers with Bragg gratings are known in applications other than glass furnaces.

In response to an interrogation signal I injected by the interrogator 14 via the proximal end of the optical fiber, each Bragg grating $22_i$ returns a response signal $R_i$ that is specific thereto.

Advantageously, a Bragg grating may therefore serve as a means for detecting the occurrence of a situation in which the Bragg grating is subjected to a temperature exceeding a threshold value causing its destruction, thus acting as a detector. A plurality of Bragg gratings of an optical fiber oriented so as to move away from the hot face of a refractory portion therefore makes it possible to measure, in stages, the wear of this refractory portion.

A Bragg grating also has the advantage of sending a response signal that is dependent on the temperature to which it is subjected. More specifically, each Bragg grating acts as an optical reflector at a wavelength that is specific thereto. However, the heating of the Bragg grating causes this wavelength to change. Of course, the wavelengths specific to the various Bragg gratings are determined so as to avoid any ambiguity as to the origin of a response signal. After having identified this origin, the interrogator can determine the change in the wavelength, or in an equivalent manner the change in the frequency, in order to determine the temperature of the Bragg grating in question or a fine change in this temperature.

FIG. 3c illustrates the particular case in which the sensors are Bragg gratings. In response to the interrogation signal, the sensors $22_i$ can return response signals centered on the frequencies $\lambda_i$ at ambient temperature (FIG. 2b) and on frequencies $\lambda_i'$ shifted with respect to the frequencies $\lambda_i$, respectively, the shift being dependent on the temperature of the sensor $22_i$. In FIG. 3c, the peaks centered on the frequencies $\lambda_i$ are shown as dashed lines and the peaks centered on the frequencies $\lambda_i'$ are shown as solid lines.

Advantageously, the measurement of temperature by means of Bragg gratings is insensitive to electromagnetic interference.

A Bragg grating may therefore not only serve as a detector, to determine whether a temperature has exceeded a threshold value, but also as a means for measuring the local temperature or the change in this temperature.

The interrogator 14 is preferably arranged at a distance from the hot face of the refractory portion, more preferably at a distance from the cold face of the refractory portion. It may in particular be arranged against the cold face of the refractory portion.

In one embodiment, the interrogator is on the outside of an insulating layer which extends against the cold face of the refractory portion. Advantageously, the interrogator is thus well protected from high temperatures.

The interrogator 14 is an electronic device which conventionally comprises a transceiver 26 and a control module 28.

The transceiver 26 is suitable for transmitting, as input to the optical fiber 12, an interrogation signal I, for example a light signal, and for receiving the one or more response signals $R_i$ received from the one or more sensors $22_i$.

The control module 28 conventionally comprises a processor and a memory into which a computer program is loaded. Using this computer program, the processor can control the transmission of the interrogation signal and analyze the signals received in order to identify the sensors which have responded.

Preferably, the computer program also makes it possible, in particular when the sensors are Bragg gratings, to measure a frequency shift resulting from the local temperature of a Bragg grating, and therefore to evaluate a temperature and/or a change in temperature with respect to previous measurements.

Production

Various techniques may be used to incorporate the measurement portion of the optical fiber 12 into the refractory portion, and in particular into the block 10.

In one embodiment, the refractory portion is formed around the fiber 12. The heat resistance of the optical fiber is however limited. This method is therefore well suited for when the refractory portion is produced by sintering, and in particular by sintering at low temperature, typically with hold temperatures lower than 1200° C. Such a method may in particular comprise the following steps:
  a) arranging the optical fiber such that a measurement portion extends into a mold;
  b) preparing a starting feedstock and pouring said starting feedstock into the mold such that said measurement portion is embedded therein, and optionally compressing the starting feedstock, so as to obtain a preform;
  c) sintering the preform at a temperature preferably of between 400 and 1200° C.

Such a method advantageously allows close contact between the optical fiber and the refractory portion, which allows good heat exchange and limits the risk of infiltration of molten glass along the measurement portion when it opens out onto the interior of the tank.

As an alternative to steps b) and c), a bath of molten material may be poured into the mold, to produce a molten product.

In one embodiment, the optical fiber is inserted, after production of the block, into a compartment made during the production of the refractory portion, and in particular of the block.

The compartment preferably takes a tubular shape.

The compartment, whether rectilinear or not, or whether it is blind or passes all the way through, preferably has an internal diameter that is substantially identical to that of the optical fiber, but slightly larger in order to allow the insertion of the optical fiber.

Preferably, the difference between the outer diameter of the compartment and the diameter of the optical fiber is less than 20%, preferably less than 10% of the diameter of the optical fiber.

In one embodiment, the compartment, which is preferably blind, is configured not to pass through the refractory portion in the direction of its thickness. After insertion into the compartment, the distal end $12_d$ therefore does not reach the hot face $16_c$.

In another embodiment, the compartment passes through the refractory portion so as to extend between two faces, preferably between the hot face and the cold face.

The compartment may be made according to a method comprising the following steps:
  A) arranging, inside a mold, a temporary part configured to, after production of the refractory portion and removal of the temporary part, leave space for a compartment for accommodating said measurement portion of the waveguide;
  B) preparing a starting feedstock and introducing said starting feedstock into the mold such that said temporary part is embedded therein, respectively, so as to obtain a preform;
  C) hardening said preform so as to form the refractory portion;
  D) removing the temporary part so as to make said compartment in the refractory portion;
  E) assembling the refractory portion with the other constituent elements of the furnace and, before or after said assembly, introducing the measurement portion into the compartment and connecting the interrogator to the input of the waveguide.

The mold may be a mold for producing a block, for example a block of more than 1 kg and/or of less than 50 kg.

Preferably, the measurement portion is then inserted into the compartment after assembly, at least partially, of the portion of the furnace comprising the block, for example after assembly of the side wall of the tank of the furnace.

The mold may be a region intended to be filled in order to form a floor.

Preferably, the temporary part takes the form of a wire.

The compartment may be made according to a method comprising the following steps:

a') arranging a wire inside a mold;
b') forming the refractory portion in the mold;
c') removing the wire, which leaves the compartment.

The wire may extend through the mold so as to form, after being removed from the produced refractory portion, a blind hole or a through-hole.

The wire may for example be made of molybdenum. Preferably, it is covered with a non-stick coating, for example hexagonal boron nitride or graphite, which facilitates its removal from the block.

The refractory portion may be made from a molten or sintered material.

Advantageously, when the refractory portion is molten, it contracts during its cooling, which facilitates the debonding of the wire.

The wire may also be "sacrificial", that is to say made of a material that can be destroyed after production of the block, for example mechanically or by chemical attack.

Operation

The operation follows directly from the above description.

In a first embodiment, the sensors act as detectors.

As shown in FIG. 2a, each sensor $22_i$ (the index "i" being an identification number of the sensor) is initially ($t=t_0$) in a position in which it can withstand the temperature to which it is subjected. In response to an interrogation signal I introduced by the transceiver 26 of the interrogator 14 as input to the optical fiber, it returns a response signal $R_i$, for example by reflecting a portion of the interrogation signal.

The transceiver 26 receives this response signal and transmits it to the control module 28.

The control model 28 analyzes the signals received and, if it detects said response signal, deduces therefrom that the sensor $22_i$ from which it originated is still operational.

The control module 28 then sends a message M containing the information according to which the sensor is operational. This message may be sent to a central computer and/or be presented to an operator, for example on a screen and/or by activating a light and/or by emitting a sound signal.

Under the effect of corrosion, the thickness of the block decreases, until it reaches the thickness $e_1$ at time $t=t_1$ (FIG. 2b). The sensor $22_1$ is considered to be the sensor closest to the molten glass V. At time $t_1$, the thickness of the material of the block separating the sensor $22_1$ from the molten glass V is decreased, such that the sensor $22_1$ is subjected to a temperature which causes its destruction.

The control module 28 notes, in response to the transmission of an interrogation signal, the absence of a response signal $R_1$ by the sensor $22_1$. It can then deduce therefrom that this sensor has been destroyed, and therefore, indirectly, that the thickness of the material of the block which separated it from the interior of the tank has been decreased.

It may then send a corresponding message M to the central computer and/or to an operator, or not send a message.

The time $t_1$ of destruction of the sensor $22_1$ depends on the nature of this sensor. In one embodiment, as shown in FIG. 2b, the sensor is destroyed before being exposed to the molten glass. In another embodiment, the sensor remains operational until it is exposed to the interior of the tank, and in particular until it comes into contact with molten glass.

In one preferred embodiment, as shown, the measurement portion 20 of the optical fiber incorporates a plurality of sensors $22_i$. The sensors which have not been destroyed return a respective response signal in reaction to the transmission of the interrogation signal I. The control module analyzes all of the response signals $R_i$ received, identifies the sensors $22_i$ at the origin of these response signals, detects the sensors which have not responded, and therefore deduces therefrom a state of corrosion of the block, that is to say evaluates the extent of the decrease in thickness.

The control module may in particular evaluate the thickness of the block which has been removed since the initial time $t_0$. It may also measure the rate at which the block is worn, from the times $t_i$ at which the sensors $22_i$ have ceased responding to the interrogation signal I.

In one preferred embodiment, at least some of the sensors, preferably each sensor $22_i$, is a measurement sensor, capable of providing, in the response signal that it returns, a quantitative indication of the temperature to which it is subjected. In particular, the sensors may be Bragg gratings. As corrosion acts to decrease the thickness of the block, the frequency of the response signal returned by a sensor changes. This change advantageously makes it possible to determine the local change in temperature.

Waveguide Arranged Between Two Blocks

The optical fiber is not necessarily integrated into the block, but may also be integrated between two adjacent blocks. Preferably, it is accommodated in a groove made in the surface of the block, so as not to protrude. More preferably, it is immobilized in the groove, preferably using a refractory cement, preferably by spots of cement, so as to accommodate dilatometric variations in the blocks between which it extends.

Waveguide in the Floor

The features described above for a refractory block are applicable to a floor 30. Conversely, the features described below for a floor are applicable to a refractory block.

In particular, when the refractory portion is a floor, the waveguide, preferably an optical fiber, may extend substantially parallel to the hot face, that is to say to the face of the floor which is in contact with molten glass (FIGS. 4 to 7).

Figure 4:
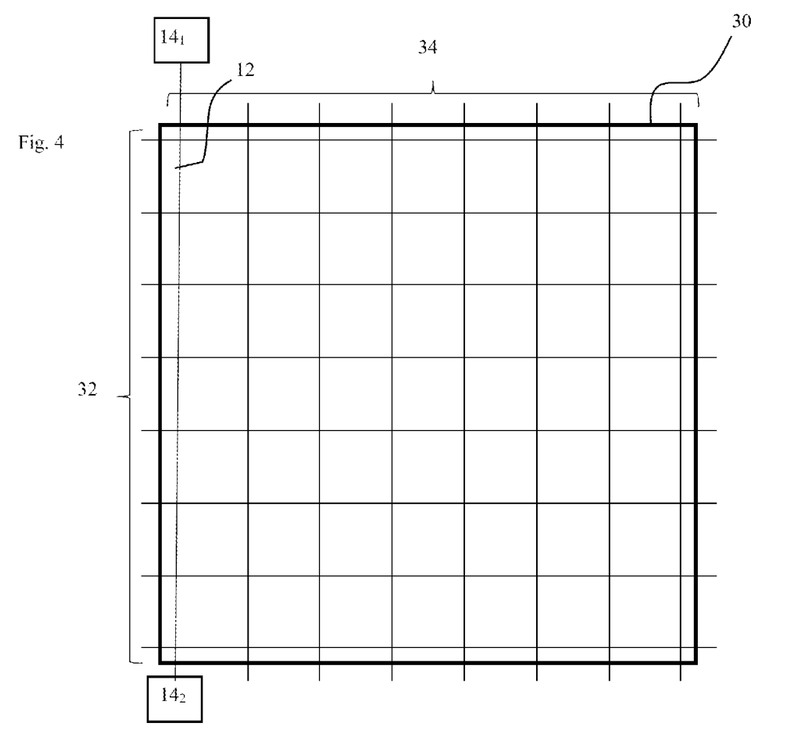
FIG. 4 illustrates, viewed from above, a floor of a glass furnace according to the invention.

Preferably, there is a network of optical fibers in the floor, preferably in the form of one or more sets of fibers in parallel, for example in the form of two sets 32 and 34, the measurement portions of which are oriented at right angles, viewed from above, as shown in FIG. 4.

Figure 5:
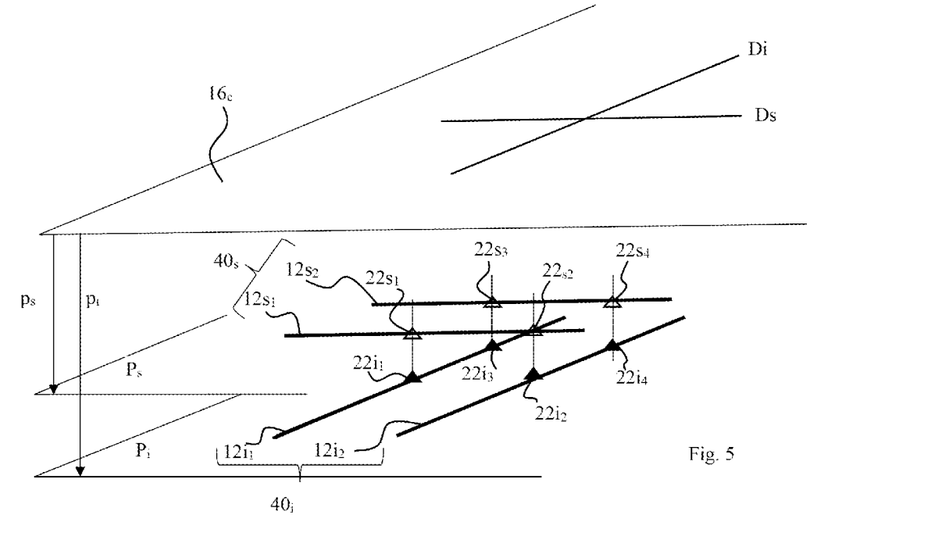
FIGS. 5 to 7 illustrate various arrangements of optical fibers in the floor of FIG. 4.
Figure 6:
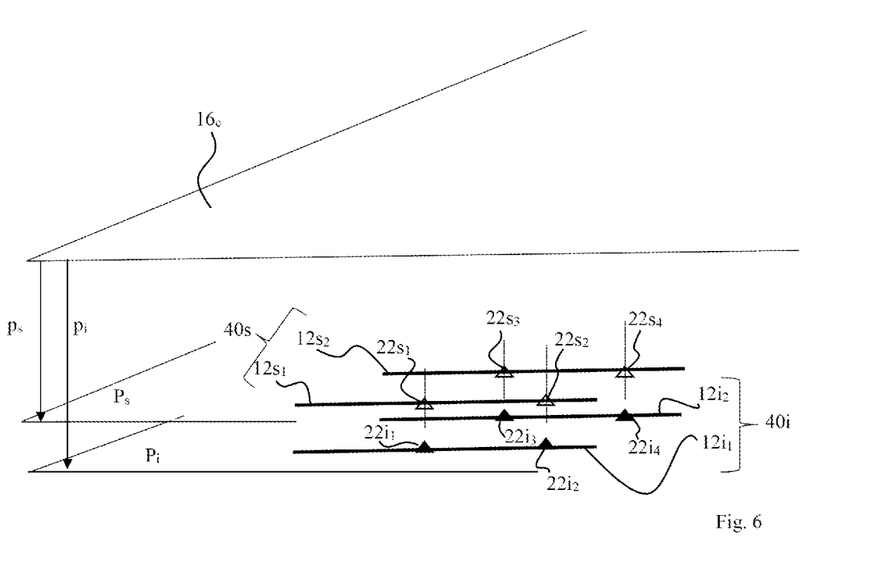
Figure 7:
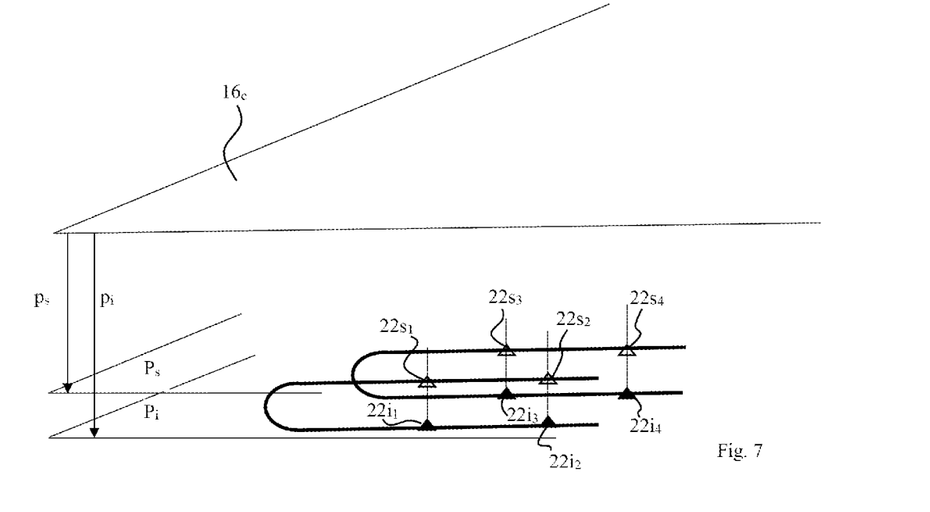

All of the optical fibers may extend in the same plane. Alternatively, some optical fibers can be arranged at different depths in the floor, in particular in the form of superposed optical fiber sheets (FIGS. 5 to 7).

Preferably, the density of sensors is higher than three, preferably higher than 10, preferably higher than 50, preferably higher than 100 sensors per $m^2$ of hot face of the floor.

Preferably, first and second interrogators $14_1$ and $14_2$ are arranged at the input and at the output of each fiber, that is to say at their proximal $12_p$ and distal $12_d$ ends, respectively. For the sake of clarity, only the first and second interrogators $14_1$ and $14_2$ of the first fiber 12 have been shown in FIG. 4.

The second interrogator therefore receives the portions of the interrogation signal I injected by the first interrogator which have not been reflected by the various sensors of the optical fiber. For example, if the optical fiber comprises only three sensors and if the interrogation signal and the response signals are those of FIGS. 3a and 3b, the second interrogator receives a signal similar to that shown in FIG. 3d.

Figure 3D:
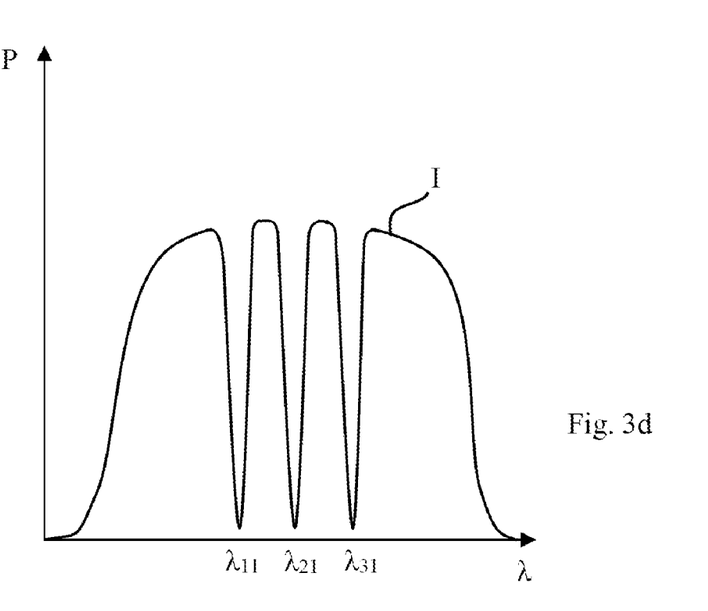

The two interrogators therefore have a signal that makes it possible to identify the sensors which have responded and, if the sensors are measurement sensors, for example Bragg gratings, makes it possible to evaluate the temperature or the change in temperature for each sensor.

Preferably, the second interrogator may also send an interrogation signal.

The presence of two interrogators advantageously makes it possible, in the event of a break in the optical fiber, to obtain information relating to the sensors on either side of the region of the break. It therefore improves the robustness of the device.

The operation is similar to that described for application to a refractory block.

In one embodiment, the sensors act as detectors and, in response to an interrogation signal I introduced by the first interrogator $14_1$ as input to the optical fiber, each return a respective response signal. Under the effect of corrosion of the floor, or the appearance of a crack, the thickness of the floor may be decreased close to a sensor, which increases the temperature to which the sensor is subjected, up to a value that causes it to be put out of service. The first interrogator and/or the second interrogator note, in response to the transmission of an interrogation signal, the absence of a signature of the sensor in the signal that they receive. They can then deduce therefrom that this sensor has been destroyed, and therefore, indirectly, that the thickness of the material of the floor of the block which separated it from the interior of the tank has been decreased. They may then send a corresponding message to the central computer and/or to an operator.

If the temperature has damaged the optical fiber such that the signal from the first interrogator cannot go beyond the sensor, for example because the fiber has been broken, the first interrogator no longer receives any information from the sensors downstream of the damaged sensor, i.e. located between this sensor and the second interrogator.

The second interrogator can then interrogate these downstream sensors, by injecting an interrogation signal and by analyzing the signal returned by these downstream sensors. The first interrogator can continue to interrogate the upstream sensors, by injecting an interrogation signal and by analyzing the signal returned by these upstream sensors. The destruction of a sensor therefore has a limited effect on the operation of the optical fiber.

In one preferred embodiment, at least some of the sensors, preferably each sensor, is a measurement sensor, capable of providing, in the response signal that it returns, a quantitative indication of the temperature to which it is subjected. In particular, the sensors may be Bragg gratings. As the thickness of the floor is decreased, the frequency of the response signal returned by a sensor changes. This change advantageously makes it possible to determine the local change in temperature. Advantageously, it is thus in particular possible to detect an abnormal change in the temperature of a sensor, and to intervene before its destruction.

In one embodiment, at least two optical fibers, or equivalently two sections of optical fiber, intersect at different depths, the depth being measured from the hot face, perpendicular to the hot face.

As shown in FIG. 5, upper $22s_i$ and lower $22i_i$ sensors of upper $12s$ and lower $12i$ optical fibers, respectively, may be superposed in the direction of the thickness of the floor, the lower fiber being an optical fiber further away from the hot face than the upper optical fiber.

After destruction of the upper sensor, it is thus possible to obtain information on the local temperature using the lower sensor.

In FIG. 5, upper $40s$ and lower $40i$ sheets comprise upper $12s_j$ and lower $12i_{j'}$ optical fibers, the indices j and j' denoting an optical fiber number in the upper $40s$ and lower $40i$ sheets, respectively. Upper $12s_j$ and lower $12i_{j'}$ optical fibers extend in upper $P_s$ and lower $P_i$ planes, respectively, parallel to the hot face $16_c$ of the floor, at depths $p_s$ and $p_i$, respectively.

In one embodiment, the upper optical fibers $12s_j$ are parallel to one another, in an upper direction Ds.

In one embodiment, the lower optical fibers $12i_{j'}$ are parallel to one another, in a lower direction Di.

The upper and lower directions may be perpendicular to one another. Viewed from above, the upper $12s_j$ and lower $12i_{j'}$ optical fibers thus form a square mesh grid, as shown in FIG. 4, or a rectangular mesh grid. The "upper sensors" $22s_i$ are those sensors which are incorporated into an upper fiber, and the "lower sensors" $22i_{i'}$ are those sensors which are incorporated into a lower fiber.

At each intersection, viewed from above, between an upper optical fiber and a lower optical fiber, an upper sensor (unfilled triangle in FIG. 5) is arranged on the upper optical fiber and a lower sensor (solid triangle in FIG. 5) is arranged on a lower optical fiber. At each intersection, a plurality of sensors are thus aligned, in a direction substantially perpendicular to the hot face, that is to say a substantially vertical direction (dotted lines).

The operation of the embodiment of FIG. 5 is similar to that of the embodiment in which the optical fiber comprises a plurality of sensors and extends perpendicular to the hot face. It is however necessary to use signals reflected by a plurality of optical fibers.

In one embodiment, the sensors act as detectors and each sensor is initially in a position in which it can withstand the temperature to which it is subjected. In response to an interrogation signal introduced by an interrogator as input to the optical fiber which contains a sensor, this sensor returns a response signal, for example by reflecting a portion of the interrogation signal. The interrogator analyzes the signals received and, if it detects said response signal, deduces therefrom that the sensor from which it originated is still operational.

Under the effect of wear, the thickness of the floor is decreased, until it reaches a thickness which takes the sensor out of service. The interrogator can deduce therefrom that the thickness of the material of the floor which separated it from the interior of the tank has been decreased.

The sensors which are beneath the out-of-service sensor are, however, still in operation and return response signals to the interrogator which interrogates them.

Wear of the floor may continue. The superposed sensors are gradually taken out of service as the wear increases. Since the identity of the superposed sensors is known, it is thus advantageously possible to evaluate the extent of the decrease in the thickness of the floor at each point of the hot face beneath which a plurality of sensors are superposed. For this purpose, a central computer may collect the messages from the various interrogators and, knowing the spatial distribution of the sensors, deduce therefrom a profile of the wear of the floor.

In one preferred embodiment, at least some of the sensors, preferably each sensor, is a measurement sensor, capable of providing, in the response signal that it returns, a quantitative indication of the temperature to which it is subjected. In particular, the sensors may be Bragg gratings. As corrosion acts to decrease the thickness of the floor, the frequency of the response signal returned by a sensor changes. This change advantageously makes it possible to precisely determine the local change in temperature.

The number of sheets is not limiting. Preferably, the density of sheets is higher than one, preferably higher than two, preferably higher than three sheets per 10 cm of thickness of the floor.

The upper fibers may form any angle with the lower fibers.

For example, in FIG. 6, all of the fibers are oriented parallel to one another.

Superposed sensors may belong to the same optical fiber, folded over on itself, as in FIG. 7. These are then sections of the same optical fiber which may be at different depths.

The embodiments described for a floor are applicable to other portions of the furnace, and in particular to a side wall of the tank of the furnace.

As is now clearly apparent, the invention provides a solution that makes it possible to evaluate, more precisely and in real time, the remaining thickness of a refractory portion of a glass furnace.

Of course, the invention is not limited to the embodiments described and shown, provided only by way of illustration.

In particular, the invention is not limited to an optical fiber as a waveguide. An optical fiber made of glass is preferred because it excludes the risk of contaminating the molten glass.

Other waveguides could however be envisaged. Preferably, however, the waveguide takes the form of a fiber that preferably has a diameter smaller than 200 micrometers.

All of the features applicable to an optical fiber and described in the present description are applicable to another type of waveguide.

All of the features applicable to a refractory block and described in the present description are applicable to another type of refractory portion.

The number of waveguides in a refractory portion, their arrangement, the number of waveguides connected to an interrogator and the shape of the refractory portion are not limiting.

The hot face of the block is not necessarily entirely in contact with the bath of molten glass. It may not even be in contact with the molten glass, but only be exposed to the gaseous environment above this bath.

The invention is also not limited just to the tank of the glass furnace. The refractory portion could for example be a block of a feeder, a superstructure part (tuckstone, crown block, etc.), a forming part (lip, etc.) or a throat block.

The invention claimed is:

1. A method for producing a glass furnace, comprising:
a refractory portion;
a waveguide comprising a measurement portion extending into the refractory portion;
an interrogator connected to an input of the waveguide and configured to inject an interrogation signal into said input;
the measurement portion of the waveguide incorporating at least one sensor configured to send a response signal to the interrogator in response to the injection of said interrogation signal,
the interrogator being configured to analyze the response signal and to send a message according to said analysis,
said method comprising the following steps:
A) arranging, inside a mold, a temporary part configured to, after production of the refractory portion and removal of the temporary part, leave space for a compartment for accommodating said measurement portion of the waveguide;
B) preparing a starting feedstock and introducing said starting feedstock into the mold such that said temporary part is embedded therein, respectively, so as to obtain a preform;
C) hardening said preform so as to form the refractory portion;
D) removing the temporary part so as to make said compartment;
E) assembling the refractory portion with other constituent elements of the furnace and, before or after said assembly, introducing the measurement portion into the compartment and connecting the interrogator to the input of the waveguide.

2. The method as claimed in claim 1, wherein, in step C), the preform is sintered at a temperature of between 400° C. and 1200° C., or wherein
the starting feedstock is a bath of molten material, the hardening in step C) resulting from the cooling of said starting feedstock.

3. The method as claimed in claim 1, wherein the temporary part comprises a wire made of molybdenum.

4. The method as claimed in claim 1, wherein the compartment is configured not to pass through the refractory portion in the direction of its thickness.

5. The method as claimed in claim 1, wherein the waveguide is an optical fiber, the sensor is a Bragg grating and the measurement portion of the waveguide comprises a plurality of said sensors.

6. The method as claimed in claim 5, wherein the sensors are arranged at regular intervals along the waveguide.

7. The method as claimed in claim 1, wherein the refractory portion is a refractory block or a floor.

8. The method as claimed in claim 1, wherein the distal end ($12_d$) of the waveguide is inside the refractory portion, preferably less than 10 cm, less than 5 cm, less than 2 cm, less than 1 cm from the hot face of the refractory portion.

9. The method as claimed in claim 1, wherein the interrogator is configured to determine, according to the analysis of the one or more response signals, a level of wear and/or a rate of wear of the refractory portion.

10. The method as claimed in claim 1, wherein the measurement portion of the waveguide is oriented toward a face of the refractory portion that is exposed to a space of the furnace containing molten glass, called the "hot face".

11. The method as claimed in claim 10, wherein the measurement portion of the waveguide is oriented perpendicular to the hot face.

12. The method as claimed in claim 1, wherein the measurement portion of the waveguide is oriented parallel to a face of the refractory portion that is exposed to a space of the furnace containing molten glass, called the "hot face".

13. The method as claimed in claim 12, comprising a sheet consisting of a set of measurement portions of said waveguides extending along a curved or planar surface, preferably along a plane parallel to the hot face.

14. The method as claimed in claim 13, wherein said measurement portions of the sheet extend parallel to one another or intersect.

15. The method as claimed in claim 13, comprising at least first and second sheets and wherein the sensors of the first sheet are distributed in a first pattern, the sensors of the second sheet are distributed in a second pattern and the first pattern and the second pattern are identical.

16. The method as claimed in claim 13, comprising more than five groups of sensors per m² of the hot face, each group comprising at least three sensors superposed in a direction of superposition which is not parallel to the hot face of the refractory portion, a sensor belonging only to one group, the directions of superposition being preferably parallel to one another.

\* \* \* \* \*